US007395549B1

(12) United States Patent
Perlman et al.

(10) Patent No.: US 7,395,549 B1
(45) Date of Patent: Jul. 1, 2008

(54) METHOD AND APPARATUS FOR PROVIDING A KEY DISTRIBUTION CENTER WITHOUT STORING LONG-TERM SERVER SECRETS

(75) Inventors: Radia J. Perlman, Acton, MA (US); Stephen R. Hanna, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 812 days.

(21) Appl. No.: 09/691,278

(22) Filed: Oct. 17, 2000

(51) Int. Cl.
*H04L 9/00* (2006.01)

(52) U.S. Cl. .................. 726/10; 726/30; 380/279; 713/155; 713/156; 713/170; 713/176

(58) Field of Classification Search .............. 713/155, 713/156, 164, 170, 176; 380/30, 259, 282, 380/279, 285; 726/5, 6, 10, 30
See application file for complete search history.

(56) References Cited

U.S. PATENT DOCUMENTS

| 5,455,953 | A | * | 10/1995 | Russell | 710/266 |
| 5,724,425 | A | | 3/1998 | Chang et al. | 380/25 |
| 5,809,144 | A | | 9/1998 | Sirbu et al. | 380/25 |
| 5,923,756 | A | | 7/1999 | Shambroom | 380/21 |

FOREIGN PATENT DOCUMENTS

EP  0 281 224 A2  3/1987

OTHER PUBLICATIONS

Ari Medvinsky et al., Public Key Utilizing Tickets for Application Servers (PKTAPP), Internet Draft, IETF Mar. 1998.*

(Continued)

*Primary Examiner*—Emmanuel L. Moise
*Assistant Examiner*—Paul Callahan
(74) *Attorney, Agent, or Firm*—Park, Vaughan & Fleming LLP

(57) ABSTRACT

One embodiment of the present invention provides a system for operating a key distribution center (KDC) that provides keys to facilitate secure communications between clients and servers across a computer network, wherein the system operates without having to store long-term server secrets. The system operates by receiving a communication from a server at the KDC. This communication includes an identifier for the server, as well as a temporary secret key to be used in communications between a client and the server for a limited time period. In response the communication, the system attempts to authenticate the server. If the server is successfully authenticated, the system stores the temporary secret key at the KDC, so that the temporary secret key can be subsequently used to facilitate communications with the server. Upon subsequently receiving a request at the KDC from a client that desires to communicate with the server, the system produces a session key to be used in communications between the client and server, and then creates a ticket to the server by encrypting an identifier for the client and the session key with the temporary secret key for the server. Next, the system assembles a message that includes the identifier for the server, the session key and the ticket to the server, and sends the message to the client in a secure manner. The system subsequently allows the client to forward the ticket to the server in order to initiate communications between the client and the server.

51 Claims, 3 Drawing Sheets

OTHER PUBLICATIONS

Brian Tung et al., Public Key Cryptography for Initial Authentication in Kerberos, Internet-Draft, IETF RFC 1510, Nov. 1999.*

M. Sirbu et al., Public-Key Based Ticket Granting Service in Kerberos, Internet-Draft, IETF RFC 1510, May 1996.*

P.V. McMahon, Sesame V2 Public Key Authorisation extensions to Kerberos,in Proceedings of the 1995 Symposium on Netwrok and Distributed System Security, pp. 114-131, Feb. 1995.*

Sirbu et al., Distributed Authentication in Kerberos Using Public Key Cryptography, IEEE 1997.*

Harbitter et al., Perfomance of Public-Key Enabled Kerberos Authentication in Large Networks, ACM Conference on Compute and Communication Security 2001.*

Schneier, Bruce: Applied Cryptography, 2$^{nd}$ Edition, Oct. 1995, pp. 43-57.*

Bruce Schneier, Applied Cryptography, John Wiley, Pub., 2nd Edition., Oct. 1995, pp. 43-57, 60, p. 570-577.*

Medvinski et al., "Public Key Utilizing Tickets for Application Servers" Common Authentication Technology Working Group, Internet Draft, Mar. 1998, pp. 1-6.*

Sirbu et al., "Public Key based Ticket granting Service on Kerberos," Internet Draft, May 1996, pagew 1-16.*

Kohl et al., "The Kerberos Network Authentication Service", Network Working Group Request For Comments (RFC) 1510, Sep. 1993, pp. 18-19, 35-36, 56-57.*

Publication entitled "Protocol Building Blocks," XP-002214000, pp. 32-33, 48-57, 60, 183-186, 566-571, Bruce Schneier: Applied Cryptography 2$^{nd}$ Edition, John Wiley & Sons Pub., Oct. 1995.

* cited by examiner

METHOD AND APPARATUS FOR PROVIDING A KEY DISTRIBUTION CENTER WITHOUT STORING LONG-TERM SERVER SECRETS

BACKGROUND

1. Field of the Invention

The present invention relates to providing security in communications across computer networks. More specifically, the present invention relates to a method and an apparatus for providing a key distribution center for clients and servers on a computer network that operates without having to store long-term server secrets.

2. Related Art

The advent of computer networks has led to an explosion in the development of applications that transfer information between computer systems across computer networks.

One problem with sending information across computer networks is that it is hard to ensure that sensitive information is kept confidential. This is because a message containing sensitive information can potentially traverse many different computer networks and many different computer systems before it arrives at its ultimate destination. An adversary can potentially intercept a message at any of these intermediate points along the way.

One way to remedy this problem is to "encrypt" sensitive data using an encryption key so that only someone who possesses a corresponding decryption key can decrypt the data. (Note that for commonly used symmetric encryption mechanisms the encryption key and the decryption key are the same key.) For example, a person sending sensitive data across a computer network can encrypt the sensitive data using the encryption key before it is sent across a computer network. At the other end, the recipient of the data can use the corresponding decryption key to decrypt the data.

Standards, such as Kerberos, have been developed to manage hundreds and potentially thousands of different keys that can be used to encrypt communications in a distributed computer system. Under Kerberos, a system can make use of a key distribution center (KDC) that stores a long-term secret for each principal in a domain. If a principal, Alice, wants to talk to another principal, Bob, Alice authenticates to the KDC, and then requests from the KDC a session key to use to talk to Bob as well as a "ticket to Bob". (Note that Alice can authenticate to the KDC using a password or long term secret. Alternatively, Alice can authenticate beforehand.) The "ticket to Bob" is a message to Bob encrypted with a secret shared between Bob and the KDC. This message includes Alice's name and the session key to be used in communicating between Bob and Alice. Alice can then send Bob this "ticket to Bob" in order to enable Alice to communicate with Bob using the session key.

Kerberos also specifies how to create a "ticket granting ticket" (TGT). In order for a workstation not to keep a principal's long term secret around for a long time, when a principal first logs on to a workstation (and presumably before he can start running potentially malicious software), the workstation requests a TGT from the KDC. This TGT is encrypted with a key known to the KDC and includes the principal's name and a session key to be used in communicating between the principal and the KDC. By using the TGT, the workstation is able, for the next several hours, to forget the principal's long-term secret and only needs to remember the session key and the TGT. Note that it is advantageous not to keep the principal's long-term secret on the workstation for a long period of time, because the long-term secret can potentially fall into the hands of an adversary who momentarily obtains access to the workstation.

Note that using a KDC introduces a security vulnerability because someone who captures the database used by the KDC has access to all of the principals' long-term secrets. Also note that long term secrets typically include principal's passwords and server's pre-shared keys. Hence, momentary compromise of the KDC can allow an unauthorized party to impersonate clients and servers until these long-term secrets are changed.

It is preferable for the KDC to only maintain public keys for the principals. These public keys can be used to encrypt messages so that only entities holding corresponding private keys (the principals) can decrypt the messages. Note that an adversary who captures a public key stored in the KDC is unable to decrypt a message encrypted with the public key. To this end, an Internet Engineering Task Force (IETF) draft entitled, "Public Key Cryptography for Initial Authentication in Kerberos" (http://search.ietf.org/internet-drafts/draft-ietf-cat-kerberos-pk-init-12.txt) discloses how users can initially authenticate to the KDC with public key cryptography by storing public keys for users at a KDC, or having users present a certificate.

Unfortunately, performing decryption using a private key is a computationally intensive task, which requires considerably more computational effort than performing decryption using a symmetric key. What is needed is a method and apparatus for facilitating encryption and decryption that provides the security of using a private key without sacrificing the performance of using a symmetric key.

SUMMARY

One embodiment of the present invention provides a system for operating a key distribution center (KDC) that provides keys to facilitate secure communications between clients and servers across a computer network, wherein the system operates without having to store long-term server secrets. The system operates by receiving a communication from a server at the KDC. This communication includes an identifier for the server, as well as a temporary secret key to be used in communications with the server for a limited time period. In response the communication, the system attempts to authenticate the server. If the server is successfully authenticated, the system stores the temporary secret key at the KDC, so that the temporary secret key can be subsequently used to facilitate communications between a client and the server. Upon subsequently receiving a request at the KDC from a client that desires to communicate with the server, the system produces a session key to be used in communications between the client and server, and then creates a ticket to the server by encrypting an identifier for the client and the session key with the temporary secret key for the server. Next, the system assembles a message that includes the identifier for the server, the session key and the ticket to the server, and sends the message to the client in a secure manner. The system subsequently allows the client to forward the ticket to the server in order to initiate communications between the client and the server.

In a variation on this embodiment, upon receiving the ticket from the client, the server decrypts the ticket using the temporary secret key to restore the session key and the identifier for the client. The server then uses the session key to protect subsequent communications between the server and the client.

In a variation on this embodiment, assembling the message involves including an expiration time for the session key in the message.

In a variation on this embodiment, allowing the client to forward the ticket to the server involves allowing the client to forward an identifier for the temporary secret key to the server, so that the server can know which temporary secret key to use in decrypting the ticket.

In a variation on this embodiment, sending the message to the client in the secure manner involves encrypting the message with a second session key that was previously communicated to the client by the KDC under protection of a password supplied by a user of the client.

In a variation on this embodiment, the system alternatively creates the ticket to the server by encrypting the identifier for the client and the session key with a public key for the server.

In a variation on this embodiment, the system alternatively creates the ticket to the server by encrypting the identifier for the client and the session key with a secret key for the server previously agreed upon between the server and the KDC and stored at the KDC.

In a variation on this embodiment, authenticating the server includes using authentication information pertaining to the server. This authentication information includes a certificate chain from a trust anchor to the server, and includes a server public key that is associated with a server private key to form a public key-private key pair associated with the server.

In a variation on this embodiment, authenticating the server involves authenticating the server without having prior configuration information pertaining to the server at the KDC.

In a variation on this embodiment, authenticating the server involves using a server public key that is stored locally in the KDC.

In a variation on this embodiment, the temporary secret key is encrypted with a public key belonging to the KDC, so that the temporary secret key can only be decrypted using a private key belonging to the KDC.

In a variation on this embodiment, the communication is signed with a server private key so that the KDC can use a corresponding server public key to verify that the communication was sent by the server.

In a variation on this embodiment, the communication is received in response to a request being sent by the KDC to the server indicating that the temporary secret key is needed from the server.

In a variation on this embodiment, the system additionally communicates information to the server that enables the server to authenticate the KDC.

In a variation on this embodiment, the KDC operates in accordance with the Kerberos standard.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Distributed Computing System

Figure 1:
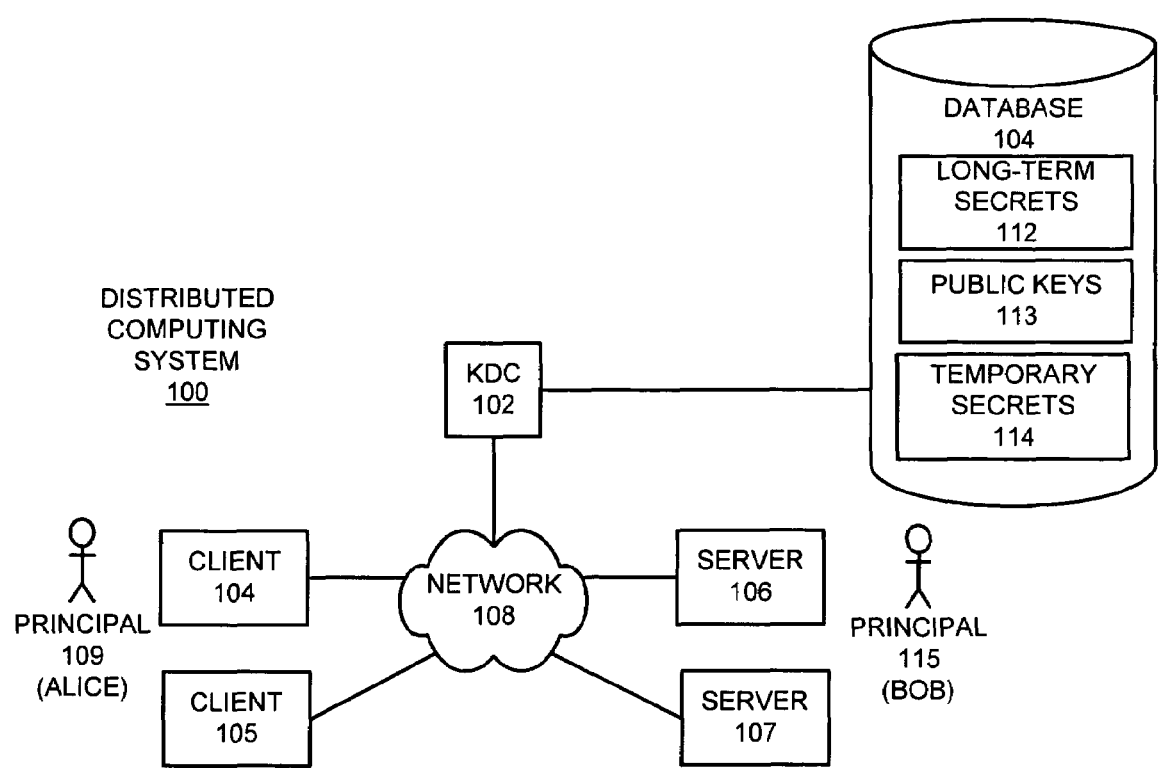
FIG. 1 illustrates a distributed computing system in accordance with an embodiment of the present invention.

FIG. 1 illustrates a distributed computing system 100 in accordance with an embodiment of the present invention. Distributed computing system 100 includes clients 104-105, servers 106-107 and key distribution center (KDC) 102 which are all coupled together through network 108.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Clients 104-105, servers 106-107 and KDC 102 can generally include any type of computer system, including, but not limited to, a computer system based on a microprocessor, a mainframe computer, a digital signal processor, a portable computing device, a personal organizer, a device controller, and a computational engine within an appliance. Note that KDC 102 may be located on a dedicated computer system, or alternatively, may be hosted on a shared computer system.

Clients 104-105 can generally include any node on network 108 including computational capability and including a mechanism for communicating across the network 108. Note that client 104 is identified with a principal 109 named "Alice". In general, a principal may include a user, a process, a program or any other entity recognized within this system. Also note that a principal need not have a name, such as "Alice", but can instead be identified using some other type of identifier, such as a number. Servers 106-107 can generally include any nodes on network 108 including a mechanism for servicing requests from a client for computational and/or data storage resources. Note that server 106 is identified with a principal 115 named "Bob".

KDC 102 is a server that supplies and manages encryption keys for use in facilitating communications between clients 104-105 and servers 106-107. KDC 102 is coupled to a database 110. Database 110 can include any type of system for storing data in volatile or non-volatile storage. This includes, but is not limited to, systems based upon magnetic, optical, and magneto-optical storage devices, as well as storage devices based on flash memory, battery-backed up memory and other types of volatile or non-volatile memory. Database 110 stores a number of different types of keys that can be used to communicate with principals 104-107. These different types of keys include long-term secrets 112, public keys 113 and temporary secrets 114.

Long-term secrets 112 are secrets that are shared between KDC 102 and principals 104-107 that enable KDC 102 to communicate securely with principals 104-107. Note that storing long-term secrets 112 gives rise to a security problem because an adversary who obtains access to database 110 is able to access all of the principals' long-term secrets. The adversary may use these long-term secrets for many unauthorized purposes, such as impersonating principals in communications with the KDC or other parties.

Public keys 113 are public keys for principals 104-107 that enable KDC 102 to communicate with principals 104-107. Alternatively, public keys 113 can include public keys for trust anchors that may be used to authenticate principals 104-107. In this case, the public keys for principals 104-107 need not be stored at KDC 102.

Short-term secrets 114 are secrets of limited duration that are shared between KDC 102 and principals 104-107. Storing short-term secrets 114 creates less vulnerability than storing long-term secrets 112, because the short-term secrets 114 will eventually become invalid after a short time period.

Note that in one embodiment of the present invention, KDC 102 can make use of either a long-term secret, a public key or a short term secret in communicating between KDC 102 and a given principal.

In earlier techniques for secure communications between clients and servers using KDCs, a client first obtains a ticket from a KDC, and then communicates with a server using that ticket. In one embodiment of the present invention, we add a new step which is the server establishing a temporary secret key with the KDC. This step typically precedes the other two.

Process of Communicating a Temporary Secret Key to the KDC

Figure 2:
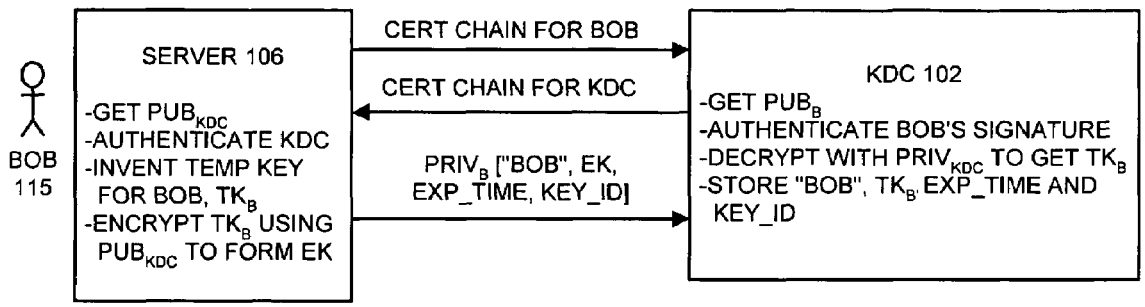
FIG. 2 illustrates the process of communicating a temporary secret key for a server to a KDC in accordance with an embodiment of the present invention.

FIG. 2 illustrates the process of communicating a temporary secret key from a server 106 to the KDC 102 in accordance with an embodiment of the present invention.

Server 106 and KDC 102 first authenticate each other by exchanging certificate chains and public keys, and using the certificate chains to authenticate each other through a chain of certifying authorities back to a trust anchor. Note that instead of exchanging certificate chains, it is possible for server 106 and KDC 102 to already possess public keys for each other.

At the end of this process, Bob holds an authenticated public key, $PUB_{KDC}$, for KDC 102, and KDC 102 holds an authenticated public key, $PUB_B$, for Bob.

Note that authenticated communications can alternatively be facilitated by communicating over a secure dedicated network, or by setting up an encrypted pipe for communications, using a protocol such as the secure socket layer protocol (SSL).

Server 106 also creates a temporary secret key for Bob, $TK_B$, and encrypts $TK_B$ with the public key belonging to KDC 102, $PUB_{KDC}$. Server 106 then creates a message containing an identifier "Bob", the encrypted temporary secret key, EK, an expiration time for $TK_B$, and a key identifier, KEY_ID. Server 106 signs this message with the private key belonging to Bob, $PRIV_B$, and sends the signed message to KDC 102. (Note in the figures that x[msg] represents msg signed with the key x, whereas x {msg} represents msg encrypted with the key x.)

KDC 102 verifies the signature on the signed message using Bob's public key, $PUB_B$. Then it decrypts the encrypted temporary secret key, EK, using the KDC's private key, $PRIV_{KDC}$, and stores the identifier, $TK_B$, KEY_ID, and the expiration time for $TK_B$, indexed by the identifier "Bob", in database 110 so that $TK_B$ can be used in subsequent communications with Bob.

The above-described process is initiated periodically (for example, every hour) by server 106 because each temporary secret key is only valid for a limited time period. Alternatively, the above-described process can be initiated in response to a request for a new temporary secret key generated by KDC 102 whenever KDC 102 requires a new temporary secret key for server 106. In yet a further alternative, KDC 102 can encrypt the ticket to Bob using Bob's public key, and if Bob does not like the overhead of decrypting using the corresponding private key, Bob can establish a temporary secret key with KDC 102. These two alternatives are especially useful when Bob is rarely accessed through KDC 102, since they avoid the overhead of periodically establishing a new temporary secret key.

If there are multiple KDCs serving principals 104-107, the multiple KDCs must somehow synchronize the temporary secret key database between themselves, or a server 106 must communicate a temporary secret key to each KDC individually. Note that server 106 may communicate different temporary secret keys with different KDCs.

If each KDC has a different secret key, either Bob must perform a trial decryption for each possible secret key, or an identifier for the temporary secret key must be sent in the clear along with an encrypted message. This identifier enables Bob to determine which temporary secret key to use in decrypting the encrypted message. The identifier is also useful during a transition period shortly after changing Bob's temporary secret key.

Storage Structure for Temporary Secret Key

Figure 3:
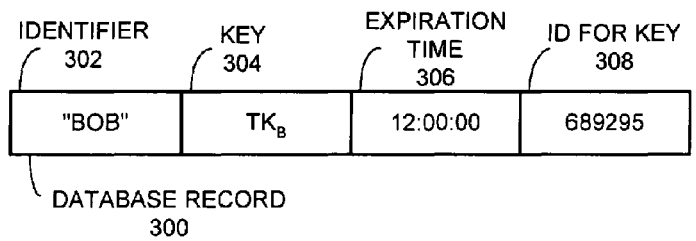
FIG. 3 illustrates how the temporary secret key is stored at the KDC in accordance with an embodiment of the present invention.

FIG. 3 illustrates how the temporary secret key, $TK_B$, is stored in database 110 at KDC 102 in accordance with an embodiment of the present invention. For each temporary secret key, database 110 stores a record 300. This record 300 includes an identifier 302, a key 304, an expiration time 306 and an ID for the key 308. The identifier 302 can include a character string that identifies a principal, such as "Bob". Key 304 holds the temporary secret key associated with the principal, $TK_B$. Expiration time 306 specifies an expiration time for $TK_B$. Finally, the ID for the key 308 specifies an identifier for $TK_B$.

Note that Bob also has to remember the temporary secret key, $TK_B$, preferably indexed by KEY_ID. In doing so, Bob can use a similar storage structure, possibly without the identifier, "Bob."

Communication Between Client and KDC

Figure 4:
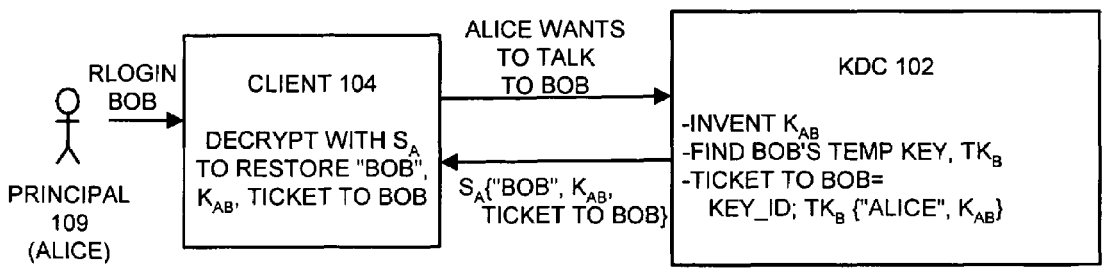
FIG. 4 illustrates how a client communicates with the KDC in accordance with an embodiment of the present invention.

FIG. 4 illustrates how client 104 communicates with KDC 102 in accordance with an embodiment of the present invention. In this example, a principal 109, Alice, associated with a client 104 requests to login to a server, Bob. Client 104 sends to KDC 102 a request to talk to Bob.

Upon receiving this request, KDC 102 creates a session key, $K_{AB}$, to be used in communications between Alice and Bob. Next, KDC 102 retrieves Bob's temporary secret key, $TK_B$, and then creates a "ticket to Bob" by using $TK_B$ to encrypt the identifier for "Alice" and $K_{AB}$, and by attaching the key identifier for $TK_B$, KEY_ID, in the clear.

KDC 102 then creates a message containing an identifier "Bob", $K_{AB}$, and the ticket to Bob, and then encrypts the message using the master key for Alice, $S_A$ (a function of Alice's password), before sending the message to client 104. Upon receiving this message, client 104 decrypts it using $S_A$ to restore the identifier, "Bob", $K_{AB}$, and the ticket to Bob.

Communication Between Client and Server

Figure 5:
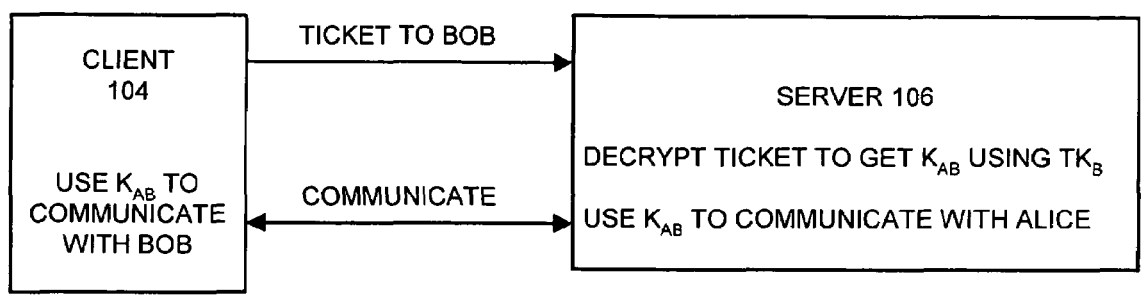
FIG. 5 illustrates how the client communicates with the server in accordance with an embodiment of the present invention.

FIG. 5 illustrates how client 104 communicates with server 106 after receiving the encrypted message from KDC 102 in accordance with an embodiment of the present invention.

In order to facilitate communications between Alice and Bob, client 104 sends the ticket to Bob to server 106. Server 106 uses the key identifier KEY_ID, to look up the temporary secret key, $TK_B$. Server 106 then uses $TK_B$ to decrypt the ticket to Bob to restore $K_{AB}$ and "Alice". Server 106 subsequently uses $K_{AB}$ in communications with client 104. If client 104 can prove it knows $K_{AB}$, Bob will know client 104 is associated with Alice.

Note that additional steps dealing with time stamps have been omitted from the above discussion related to FIGS. 4-5.

Also note that from Alice's perspective nothing changes in the process outlined in FIGS. 4 and 5 from standard Kerberos, because Alice is oblivious as to whether a temporary secret key or a permanent secret key is used to encrypt the ticket to Bob. Only KDC 102 and server 106 need to be aware of the fact that a temporary secret key has been used instead of a permanent secret key.

Additionally, note that Alice can use a TGT in communicating with the KDC.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for operating a key distribution center (KDC) that provides keys to facilitate secure communications between clients and servers across a computer network, wherein the KDC operates without having to store long-term server secrets, comprising: receiving a communication from a server that is authenticated at the KDC; wherein the communication includes a temporary secret key to be used in communications with the server for a limited time period, and wherein the temporary secret key is shared between the server and the KDC; and storing the temporary secret key in a database at the KDC, so that the temporary secret key can be subsequently used to facilitate one or more communications between a client and the server, wherein the temporary secret key is encrypted with a public key belonging to the KDC, so that the temporary secret key can only be decrypted using a private key belonging to the KDC; wherein the temporary secret key is a short-term secret which becomes invalid after a short time period; and wherein the server generates a new temporary secret key in response to a request from the KDC for a new temporary secret key to replace the invalid temporary secret key.

2. The method of claim 1, wherein upon subsequently receiving:
 a request from the client at the KDC to communicate with the server, the method further comprises facilitating communications between the client and the server by:
 producing a session key to be used in communications between the client and server;
 creating a ticket to the server by encrypting an identifier for the client and the session key with the temporary secret key for the server; and
 assembling a message that includes the identifier for the server, the session key and the ticket to the server; and
 sending the message to the client in a secure manner; and
 allowing the client to forward the ticket to the server in order to initiate communications between the client and the server.

3. The method of claim 2, wherein upon receiving the ticket from the client at the server, the method further comprises:
 decrypting the ticket at the server using the temporary secret key to restore the session key and the identifier for the client; and
 using the session key at the server to protect subsequent communications between the server and the client.

4. The method of claim 2, wherein assembling the message involves including an expiration time for the session key in the message.

5. The method of claim 2, wherein allowing the client to forward the ticket to the server includes allowing the client to forward an identifier for the temporary secret key to the server, so that the server can know which temporary secret key to use in decrypting the ticket.

6. The method of claim 2, wherein sending the message to the client in the secure manner involves encrypting the message with a second session key that was previously communicated to the client by the KDC.

7. The method of claim 2, further comprising alternatively creating the ticket to the server by encrypting the identifier for the client and the session key with one of:
 a public key for the server; and
 a secret key for the server previously agreed upon between the server and the KDC and stored at the KDC.

8. The method of claim 1, wherein receiving the communication from the server involves authenticating the server.

9. The method of claim 8, wherein authenticating the server involves using authentication information pertaining to the server, the authentication information including a certificate chain from a trust anchor to the server, and including a server public key that is associated with a server private key to form a public key-private key pair associated with the server.

10. The method of claim 8, wherein authenticating the server involves authenticating the server without having prior configuration information pertaining to the server at the KDC.

11. The method of claim 8, wherein authenticating the server includes using a server public key that is stored locally in the KDC.

12. The method of claim 1, wherein the communication is signed with a server private key so that the KDC can use a corresponding server public key to verify that the communication was sent by the server.

13. The method of claim 1, wherein the communication is received in response to a request being sent by the KDC to the server indicating that the temporary secret key is needed from the server.

14. The method of claim 1, further comprising communicating information to the server that enables the server to authenticate the KDC.

15. The method of claim 1, wherein the KDC operates in accordance with the Kerberos standard.

16. The method of claim 1, wherein the communication received from the server additionally includes an identifier for the server.

17. The method of claim 1, further comprising propagating the temporary secret key to multiple KDCs.

18. A computer-readable storage medium storing instructions that when executed by a computer cause the computer to perform a method for operating a key distribution center (KDC) that provides keys to facilitate secure communications between clients and servers across a computer network, wherein the KDC operates without having to store long-term server secrets, the method comprising: receiving a communication from a server that is authenticated at the KDC; wherein the communication includes a temporary secret key to be used in communications with the server for a limited time period, and wherein the temporary secret key is shared between the server and the KDC; and storing the temporary secret key in a database at the KDC, so that the temporary secret key can be subsequently used to facilitate one or more communications between a client and the server, wherein the temporary secret key is encrypted with a public key belonging to the KDC so that the temporary secret key can only be decrypted using a private key belonging to the KDC; wherein the temporary secret key is a short-term secret which becomes invalid after a short time period; and wherein the server generates a new temporary secret key in response to a request from the KDC for a new temporary secret key to replace the invalid temporary secret key.

19. The computer-readable storage medium of claim 18, wherein upon subsequently receiving a request from the client at the KDC to communicate with the server, the method further comprises facilitating communications between the client and the server by:
  producing a session key to be used in communications between the client and server;
  creating a ticket to the server by encrypting an identifier for the client and the session key with the temporary secret key for the server; and
  assembling a message that includes the identifier for the server, the session key and the ticket to the server; and
  sending the message to the client in a secure manner; and
  allowing the client to forward the ticket to the server in order to initiate communications between the client and the server.

20. The computer-readable storage medium of claim 19, wherein upon receiving the ticket from the client at the server, the method further comprises:
  decrypting the ticket at the server using the temporary secret key to restore the session key and the identifier for the client; and
  using the session key at the server to protect subsequent communications between the server and the client.

21. The computer-readable storage medium of claim 19, wherein assembling the message involves including an expiration time for the session key in the message.

22. The computer-readable storage medium of claim 19, wherein allowing the client to forward the ticket to the server includes allowing the client to forward an identifier for the temporary secret key to the server, so that the server can know which temporary secret key to use in decrypting the ticket.

23. The computer-readable storage medium of claim 19, wherein sending the message to the client in the secure manner involves encrypting the message with a second session key that was previously communicated to the client by the KDC.

24. The computer-readable storage medium of claim 19, wherein the method further comprises alternatively creating the ticket to the server by encrypting the identifier for the client and the session key with one of:
  a public key for the server; and
  a secret key for the server previously agreed upon between the server and the KDC and stored at the KDC.

25. The computer-readable storage medium of claim 18, wherein receiving the communication from the server involves authenticating the server.

26. The computer-readable storage medium of claim 25, wherein authenticating the server involves using authentication information pertaining to the server, the authentication information including a certificate chain from a trust anchor to the server, and including a server public key that is associated with a server private key to form a public key-private key pair associated with the server.

27. The computer-readable storage medium of claim 25, wherein authenticating the server involves authenticating the server without having prior configuration information pertaining to the server at the KDC.

28. The computer-readable storage medium of claim 25, wherein authenticating the server includes using a server public key that is stored locally in the KDC.

29. The computer-readable storage medium of claim 19, wherein the communication is signed with a server private key so that the KDC can use a corresponding server public key to verify that the communication was sent by the server.

30. The computer-readable storage medium of claim 18, wherein the communication is received in response to a request being sent by the KDC to the server indicating that the temporary secret key is needed from the server.

31. The computer-readable storage medium of claim 18, wherein the method further comprises communicating information to the server that enables the server to authenticate the KDC.

32. The computer-readable storage medium of claim 18, wherein the KDC operates in accordance with the Kerberos standard.

33. The computer-readable storage medium of claim 18, wherein the communication received from the server additionally includes an identifier for the server.

34. The computer-readable storage medium of claim 18, wherein the method further comprises propagating the temporary secret key to multiple KDCs.

35. An apparatus that provides keys to facilitate secure communications between clients and servers across a computer network, wherein the apparatus operates without having to store long-term server secrets, comprising: a key distribution center (KDC); a receiving mechanism within the KDC that is configured to receive a communication from a server; wherein the communication includes a temporary secret key to be used in communications with the server for a limited time period, and wherein the temporary secret key is shared between the server and the KDC; and a storage mechanism within the KDC that is configured to store the temporary secret key in a database at the KDC, so that the temporary secret key can be subsequently used to facilitate one or more communications between a client and the server, wherein the temporary secret key is encrypted with a public key belonging to the KDC, so that the temporary secret key can only be decrypted using a private key belonging to the KDC; wherein the temporary secret key is a short-term secret which becomes invalid after a short time period; and wherein the server generates a new temporary secret key in response to a request from the KDC for a new temporary secret key to replace the invalid temporary secret key.

36. The apparatus of claim 35, further comprising a communication facilitation mechanism within the KDC, wherein upon receiving a request from the client to communicate with the server, the communication facilitation mechanism is configured to:
  produce a session key to be used in communications between the client and server;
  create a ticket to the server by encrypting an identifier for the client and the session key with the temporary secret key for the server;
  assemble a message that includes the identifier for the server, the session key and the ticket to the server;

send the message to the client in a secure manner; and to
allow the client to forward the ticket to the server in order to initiate communications between the client and the server.

37. The apparatus of claim 36, further comprising a mechanism within the server that is configured to:
decrypt the ticket received from the client using the temporary secret key to restore the session key and the identifier for the client; and to
use the session key to protect subsequent communications between the server and the client.

38. The apparatus of claim 36, wherein the communication facilitation mechanism is configured to include an expiration time for the session key in the message.

39. The apparatus of claim 36, wherein the client is configured to additionally forward an identifier for the temporary secret key to the server, so that the server can know which temporary secret key to use in decrypting the ticket.

40. The apparatus of claim 36, wherein in sending the message to the client in the secure manner, the communication facilitation mechanism is configured to encrypt the message with a second session key that was previously communicated to the client by the KDC.

41. The apparatus of claim 36, wherein the communication facilitation mechanism is configured to alternatively create the ticket to the server by encrypting the identifier for the client and the session key with one of:
a public key for the server; and
a secret key for the server previously agreed upon between the server and the KDC and stored at the KDC.

42. The computer-readable storage medium of claim 35, further comprising an authentication mechanism that is configured to authenticate the server.

43. The apparatus of claim 42, wherein in authenticating the server, the authentication mechanism is configured to use authentication information pertaining to the server, the authentication information including a certificate chain from a trust anchor to the server, and including a server public key that is associated with a server private key to form a public key-private key pair associated with the server.

44. The apparatus of claim 42, wherein in authenticating the server the authentication mechanism is configured to operate without having prior configuration information pertaining to the server at the KDC.

45. The apparatus of claim 42, wherein in authenticating the server, the authentication mechanism is configured to use a server public key that is stored locally in the KDC.

46. The apparatus of claim 35, wherein the communication is signed with a server private key so that the KDC can use a corresponding server public key to verify that the communication was sent by the server.

47. The apparatus of claim 35, further comprising a requesting mechanism within the KDC that is configured to send a request to the server indicating that the temporary secret key is needed from the server.

48. The apparatus of claim 35, further comprising a sending mechanism that is configured to send information to the server that enables the server to authenticate the KDC.

49. The apparatus of claim 35, wherein the KDC is configured to operate in accordance with the Kerberos standard.

50. The apparatus of claim 35, wherein the communication received from the server additionally includes an identifier for the server.

51. The apparatus of claim 35, wherein the storage mechanism is additionally configured to communicate the temporary secret key to multiple KDCs.

* * * * *